March 2, 1954  B. L. HAVENS ET AL  2,671,182
PULSE COINCIDENCE INDICATOR
Filed Oct. 3, 1945
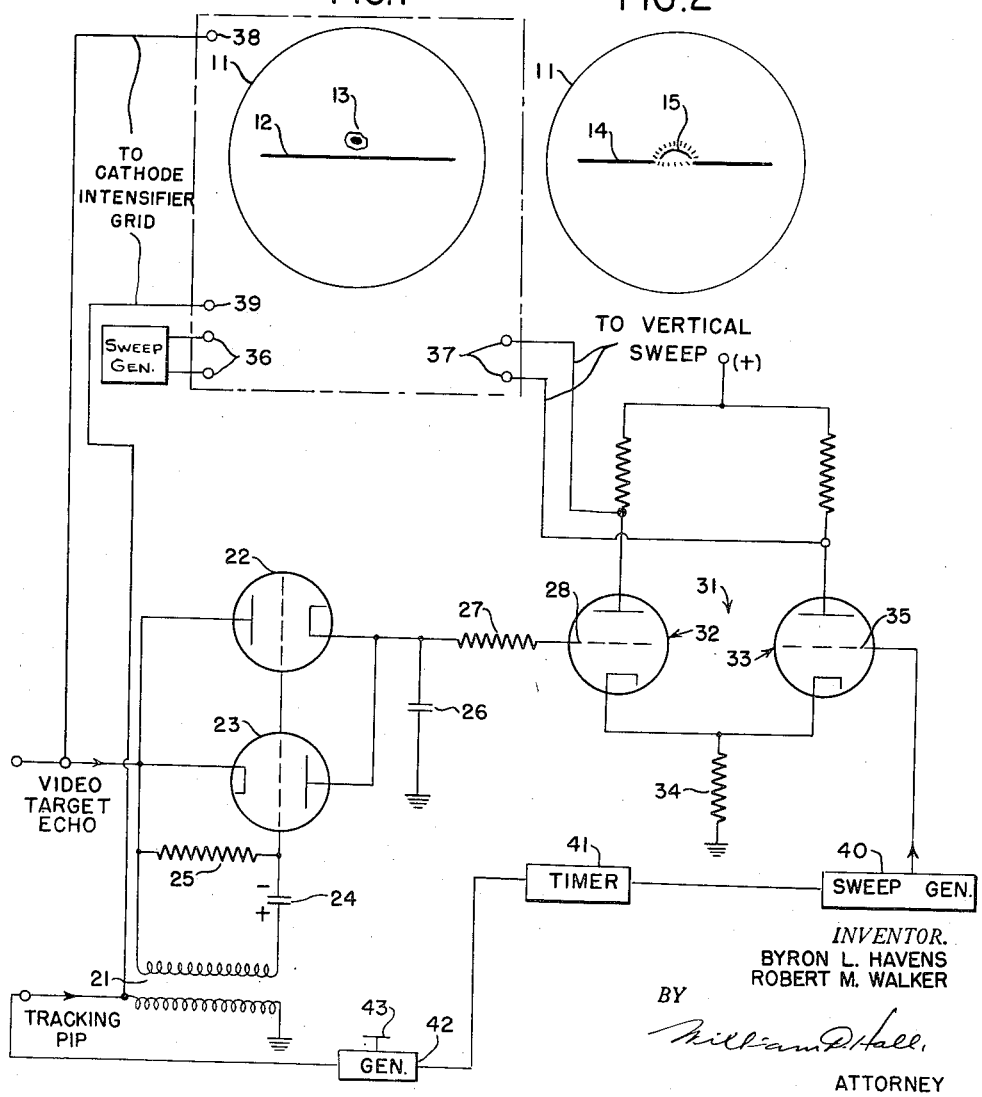
INVENTOR.
BYRON L. HAVENS
ROBERT M. WALKER
BY
William D. Hall,
ATTORNEY Patented Mar. 2, 1954

2,671,182

UNITED STATES PATENT OFFICE 2,671,182

PULSE COINCIDENCE INDICATOR

Byron L. Havens, Cambridge, and Robert M. Walker, Belmont, Mass., assignors, by mesne assignments, to the United States of America as represented by the Secretary of War Application October 3, 1945, Serial No. 620,133

10 Claims. (Cl. 315—22)

This invention relates to radio object-locating equipment and more particularly to a means of and a method for indicating the coincident occurrence of two voltage pips, as for example a locally generated pip and a pip produced by the return signal from a target.

In many applications of radio object-locating equipment, such as in gun laying or bombing equipment, it is desirable to be able to produce a voltage pulse or pip which coincides in time with a selected target echo. Such a pip if properly maintained in coincidence may be used for automatically releasing bombs or otherwise as may be desired.

It is an object of the present invention, therefore, to provide a method for indicating the coincident occurrence of two voltage pips.

It is a further object of the present invention to provide an improved device for indicating the coincident occurrence of two voltage pips.

Fig. 1 illustrates schematically a circuit arrangement and cathode ray indicator presentation just before the coincident occurrence of two pulses or pips; and Fig. 2 illustrates the indicator presentation during coincident occurrence.

It is assumed herein that a "B" type scope presentation is used. In a "B" type presentation, as is well known in the art, the azimuth of targets is given by a right or left coordinate and range by a vertical coordinate.

The timer 41 may synchronize the transmitted pulse with the beginning of the vertical or range sweep generated at 40 and applied to the scope at 37, the pulse repetition rate being the same as the sweep repetition rate, so that range is indicated by the vertical coordinate of the scope. The return echo or video signal is applied by way of input terminal 38 to an intensifier grid or cathode of the cathode ray tube, thereby causing the indication 13.

The horizontal sweep or deflection voltage, which may be a substantially sinusoidal signal, may be applied to the horizontal deflection input terminal 36. The horizontal sweep frequency is considerably lower, preferably many times, than the vertical sweep frequency. A tracking pip, synchronized with the beginning of the vertical sweep, may be generated at 42, having a repetition rate corresponding to the sweep repetition rate and a time or range interval controlled in any convenient manner well known to the art as by control 43, and may be applied by way of terminal 39 to an intensifier grid of the cathode ray tube.

As the sinusoidal signal on horizontal deflection control terminals 36 causes the vertical beam sweep to move horizontally back and forth across the face of the tube, the beam traces a series of substantially parallel vertical lines. The tracking pip causes the periodic intensification of the beam at a corresponding point in each line, hence forming on the tube screen the luminescent horizontal line 12.

For an example of a circuit for the generation of the tracking pip as well as a system in which the present invention may be utilized reference is had to the copending application of Byron L. Havens and John J. Lentz, for Electrical System, Serial No. 620,134, filed October 3, 1945. In this system, the horizontal deflection voltage periodically varies with the horizontal scanning of the antenna, so that the horizontal coordinate of the tube screen indicates azimuth.

Fig. 2 illustrates the indicator presentation when coincidence occurs. It will be noted that the normally straight line formed by the tracking pip in Fig. 1 is now distorted at a position corresponding in azimuth to that of the target. This condition is illustrated by line 14 with its distorted portion 15. This effect may be accomplished by any circuit capable of causing the tracking pip to occur at a different point on the indicator face 11. One expedient which might be used would be to cause the tracking pip to be delayed, or to delay its time of generation, by an amount proportional to the amplitude of the return echo pip. Another expedient would be to change the starting level, i. e., the point on the face 11 at which range sweep starts, thus shifting all indications at the azimuth of the target echo pip. It will be realized by those skilled in the art that other means may be employed in producing the desired distortion of the tracking pip line 12 to indicate coincidence of tracking and target echo pips, and, therefore, the invention herein disclosed is not to be construed as being limited to the specific circuits shown herein.

Referring to Fig. 1 of the drawing, there is shown a circuit capable of accomplishing the desired coincidence indication by shifting the starting level of the range sweep. Besides being connected to the indicator, the tracking pip is coupled through a transformer 21 to tubes 22 and 23, which are preferably of the triode type. The tubes 22 and 23 are so connected to each other that the plate of tube 22 is connected to the cathode of tube 23, and so that the cathode of tube 22 is connected to the plate of tube 23. The grids of the tubes 22 and 23 are connected together and connected through a capacitor 24 to one terminal of the secondary winding of transformer 21. A resistor 25 is connected from the grid to the cathode of tube 23 which is also connected to the remaining terminal of the secondary winding transformer 21. Besides being connected to the indicator, the target echo pip is also connected to the cathode of tube 23. The input terminal for this pip is labeled "video." A capacitor 26 is connected from the cathode of tube 22 to ground. The cathode of tube 22 is also connected through an isolating resistor 27 to one control grid 28 of a push-pull amplifier, denoted generally by 31. The push-pull amplifier comprises tubes 32 and 33 having a common unbypassed cathode resistor 34 for cathode coupling. As aforementioned, a sawtooth voltage to provide range sweep on the indicator is applied to the remaining control grid 35 of amplifier 31. The resultant amplified sawtooth sweep voltage is taken in push-pull from the plates of tubes 32 and 33 and applied to the indicator of the radio object-locating equipment. It will be obvious to those skilled in the art that the starting level of the range sweep on the indicator is dependent upon the potential of grid 28. Therefore, if the potential of grid 28 is made to vary in accordance with the amplitude of the target echo pip, the desired coincidence indication will result.

It will now be shown that the potential across capacitor 26 and at grid 28 varies in accordance with the amplitude of the target echo pip. It is first assumed that no potential exists across capacitor 24. The tracking pip is impressed across the primary winding of transformer 21, and a voltage pulse appears across the secondary winding. The magnitude of this pulse may be as high as 100 volts. The polarity of this pulse is such that the grid of tube 23 tries to go positive with resulting grid current flow which will charge capacitor 24 with a polarity as shown. While the pulse is applied, tube 22 is in such a state as to conduct if the potential on the video terminal is higher than the potential across capacitor 26. Further, if the potential on the video terminal is lower than the potential on capacitor 26, tube 23 will conduct. It will thus be seen then that the potential across capacitor 26 will, during the time of application of the tracking pip, change in such a manner as to become the same as the potential at the video terminal. After the occurrence of the tracking pip, the potential across the secondary winding of transformer 21 becomes zero, but now the capacitor 24, which must discharge slowly through resistor 25 so biases tubes 22 and 23 that they are rendered nonconducting, and the potential across capacitor 26 remains at the value which it attained during the time of occurrence of the tracking pip. The above action will occur with each incoming tracking pip, and the potential on grid 28 will vary in accordance with the amplitude of the target echo pip. It is to be noted that the potential across capacitor 26 cannot charge from zero unless the tracking pip and the target echo pip occur at the same time, and, therefore, shifting of the starting level of the range sweep is an accurate indication of coincidence between tracking and echo pips.

While there has been described what is at present considered the preferred embodiment of the invention, it will be obvious to those skilled in the art that various changes and modifications may be made therein without departing from the invention.

What is claimed is:

1. In pulse coincidence indicator apparatus of the character disclosed, in combination, cathode ray tube indicator means including a beam, screen, and intensifier means, said cathode ray indicator means having first and second sweep generator means operatively connected thereto, tracking pulse generator means for periodically generating a tracking pulse, said last mentioned means synchronized with said first sweep generator means and operatively connected to said intensifier means, whereby the tracking pulse periodically actuates said intensifier means to intensity modulate said beam thereby forming a trace on said cathode ray tube said intensifier means being adapted to have a target echo pulse also applied thereto, said target echo pulse intensity modulating said sweep thereby forming a target on said screen and sweep modulator means operatively connected to said first sweep generator means and having said tracking pulse and target echo pulse applied thereto for supplying a modulator output, said first sweep generator means being adapted to be modulated by said output to instantaneously increase the sweep amplitude thereby to indicate on said screen substantial concurrence of the tracking pulse and target echo pulse.

2. In apparatus of the character disclosed for indicating the coincidence of two pulses, in combination, cathode ray oscilloscope means having an intensifiable beam and screen, first linear sweep generating means operatively connected to said oscilloscope means for sweeping the beam thereof in one direction, said first sweep generating means including an electron discharge tube having a grid for controlling the amplitude of the sweep voltage in accordance with the potential on said grid, second sweep generating means operatively connected to said oscilloscope means for sweeping the beam thereof in a second direction substantially perpendicular to said first direction, first intensifier means including a tracking pulse generator connected to said oscilloscope for periodically intensifying the beam thereof in accordance with a pulsed tracking signal, said pulsed tracking signal being in substantial synchronism with the first sweep, second intensifier means connected to said oscilloscope for periodically intensifying the beam thereof in accordance with a second pulsed signal, and means energized by said tracking signal and second pulsed signal and operatively connected to said electron discharge tube for altering the potential on said grid thereby to momentarily increase the sweep voltage and indicate substantial concurrence on the screen of the pulse positions.

3. In apparatus of the character disclosed for indicating the coincidence between two pulses, in combination, a cathode ray oscilloscope having a screen and having first and second deflecting means for deflecting the beam in first and second substantially mutually perpendicular directions, said oscilloscope also having first and second beam intensifier elements, generator means connected to said oscilloscope for applying a pulsed linear sweep voltage to said first deflecting means, means connected to said oscilloscope for applying an additional periodically varying sweep voltage to said second deflecting means, means connected to said oscilloscope for applying a first pulsed signal voltage having the same repetition frequency as the linear sweep voltage to said first intensifier element in synchronization with said linear sweep voltage thereby to form a luminescent spot indication at a predetermined place on said screen corresponding to the time relationship between the sweep voltage and said pulsed signal voltage, means connected to said second intensifier element for applying a pulsed tracking voltage thereto having a repetition frequency corresponding to the frequency of the pulsed sweep voltage thereby to form a second indication on said screen, and sweep modulator means having said pulsed tracking voltage and said pulsed signal voltage applied thereto and connected to said linear sweep generator means for causing the sweep voltage to be momentarily increased when the pulsed tracking voltage and pulsed signal voltage are in substantial time coincidence thereby to cause the two indications on the screen to blend into a markedly unified indication.

4. In apparatus of the character disclosed for indicating the coincidence between two pulses, in combination, a cathode ray oscilloscope having a screen and having first and second deflecting means for deflecting the beam in first and second substantially mutually perpendicular planes, said oscilloscope having first and second beam intensifier elements, generator means connected to said oscilloscope for applying a pulsed linear sweep voltage to said first deflecting means, said generator means comprising a saw tooth signal generator and a signal amplifier including a pair of electron discharge tubes each having a grid, cathode, and anode, the saw tooth signal being applied to the grid of one of said tubes, said cathodes being operatively connected together, said anodes being operatively connected to said first deflecting means, means connected to said oscilloscope for applying an additional periodically varying sweep voltage to said second deflecting means, means connected to said oscilloscope for applying a first pulsed signal voltage having the same repetition frequency as the linear sweep voltage to said first intensifier element in synchronization with said linear sweep voltage thereby to form a luminescent spot indication at a predetermined place on said screen corresponding to the time relationship between the sweep voltage and said pulsed signal voltage, means connected to said second intensifier element for applying a pulsed tracking voltage thereto having a repetition frequency corresponding to the frequency of the pulsed sweep voltage thereby to form a second indication on said screen, and bias generating means having said pulsed tracking voltage and said pulsed signal voltage applied thereto and connected to the grid of the other of said pair of electron discharge tubes for causing the sweep voltage to be momentarily increased when the pulsed tracking voltage and pulsed signal voltage are in substantial time coincidence thereby to cause the two indications on the screen to blend into a markedly unified indication.

5. Apparatus according to claim 4 wherein said bias generating means comprises an additional pair of electron discharge tubes, each tube of said additional pair having a cathode, grid, and anode, said last named grids being connected together, an input transformer having a primary and secondary, said primary being energized by said pulsed tracking signal, a capacitor, said secondary having one end thereof connected to the anode of one of said last named pair of tubes and the cathode of the other of said last named pair of tubes, said end having said pulsed signal voltage applied thereto, the other end of said secondary being connected by way of said capacitor to said last named grids, a resistor connected between said last named grids and said last named cathode and anode, and resistance-capacitance network means connecting the remaining anode and remaining cathode of said last named pair of tubes to the grid of the other of said first named pair of tubes, said bias generating means providing a bias to said last named grid.

6. A pulse coincidence indicator comprising a cathode ray tube having a beam, beam intensifier means, and a plurality of sweep generator means, tracking pip generator means for periodically generating a tracking pip operatively connected to one of said sweep generator means and operative in timed relation to said sweep generator means, said tracking pip generator means being connected to said beam intensifier means so that the periodic occurrence of the generated tracking pip will intensity modulate the sweep at a predetermined portion thereof and thereby form a tracking pip trace, sweep generator modulation means, said tracking pip generator means being operatively connected to said sweep generator modulation means, a target echo receiving means, said target echo receiving means also being operatively connected to said sweep generator modulation means and to said beam intensifier means, said sweep generator modulation means being operatively connected to said one sweep generator means whereby the sweep signal generated by the said one sweep generator means is modulated in accordance with the intelligence received from the tracking pip generator means and the target echo receiving means to cause a portion of the tracking pip trace to become distorted to thereby signify the pulse coincidence of the target echo and the tracking pip.

7. A pulse coincidence indicator comprising a cathode ray tube having a beam, screen, a plurality of sweep generator means, and beam intensifier means, a pip generator connected by means of operative connections to one of said sweep generators and to said beam intensifier means and operative in timed relation relative to said sweep generator means, whereby periodic pip generator by said pip generator periodically causes an intensification of said beam to thereby form a trace on said screen, a signal pulse, said signal pulse also being applied to said beam intensification means for periodically intensifying said beam means and thereby forming a signal response on said screen, said signal pulse also being connected by means of operative connections to said one sweep generator means, said operative connections between said signal pulse and sweep generator means and between said pip generator and said sweep generator means comprising means for modulating said sweep formed by said sweep generator means to thereby cause said trace to be distorted whenever said tracking pip and said signal pulse are simultaneously applied to said means for modulating said sweep.

8. A pulse coincidence indicator comprising a cathode ray tube having a beam, a screen, first and second sweep generating means, and beam intensifying means, the first of said sweep generating means causing said beam to linearly traverse the screen, the second of said sweep generator means operative in timed relationship to said first sweep generating means and thereby causing said first sweep generating means to generate a series of parallel lines on the screen, tracking pip generator means connected to said beam intensifier means, operative connection means connecting said tracking pip generator means to said first sweep generating means, said tracking pip generator means operative in timed relationship to said first sweep generator means whereby periodic pip generation by said tracking pip generator periodically intensifies said beam to thereby form a trace on said screen, an echo pulse, said echo pulse being applied to said beam intensifier means to form a signal on said screen, said operative connection means also applying said echo pulse to said first sweep generating means, said operative connection means being capable of applying said tracking pip and target echo to said first sweep generating means only when they are simultaneously impressed on said operative connection means to cause the trace which is formed by said tracking pip to become distorted thereby indicating coincidence of the tracking pip and the target echo.

9. A pulse coincidence indicator comprising a cathode ray tube having a beam, a screen, first and second sweep generating means, and beam intensifier means, the first of said sweep generating means causing said beam to traverse the screen, the second of said sweep generating means operative in timed relationship to said first sweep generating means to cause said first sweep generating means to generate a series of substantially equidistantly spaced lines on said screen, a tracking pip generator means for generating a tracking pip pulse, said tracking pip generator means being connected to said beam intensifier means and generating said pulse in timed relationship to said first sweep generator means whereby through the energization of said beam intensification means by said tracking pip generator pulse a predetermined portion of each of said lines is intensified and the series of intensifications thus formed combine to form a trace on said screen, operative connection means connecting said tracking pip generating means to said first sweep generating means, a second pulse, said operative connection means also connecting said second pulse to said first sweep generator means, said operative connection means being operable only when said tracking pip pulse and said second pulse are simultaneously applied thereto whereby the trace on the screen is caused to become distorted to indicate coincidence between the tracking pip pulse and the second pulse.

10. A pulse coincidence indicator as set forth in claim 9 wherein said operative connection means comprise first and second space discharge devices each having a cathode, plate, and grid, said devices being connected so that the plate of the first of said devices is connected to the cathode of the second and the plate of the second is connected to the cathode of the first, and the grids of said devices are connected together, the tracking pip pulse being applied to said grids and the second pulse being applied to the cathode of said first discharge device, and the cathode of the second discharge device being connected to the output of the first sweep generator so as to modify the output of said first sweep generator.

BYRON L. HAVENS.
ROBERT M. WALKER.

References Cited in the file of this patent
UNITED STATES PATENTS

| Number | Name | Date |
| --- | --- | --- |
| 2,355,363 | Christaldi | Aug. 8, 1944 |
| 2,375,709 | Thompson | May 8, 1945 |
| 2,404,527 | Potapenko | July 23, 1946 |
| 2,425,330 | Kenyon | Aug. 12, 1947 |
| 2,448,041 | Marchand | Aug. 31, 1948 |
| 2,453,711 | Isbister et al. | Nov. 16, 1948 |
| 2,465,368 | Frink | Mar. 29, 1949 |
| 2,480,837 | Busignies | Sept. 6, 1949 |
| 2,492,700 | Jeanne | Dec. 27, 1949 |

FOREIGN PATENTS

| Number | Country | Date |
| --- | --- | --- |
| 552,072 | Great Britain | Mar. 22, 1943 |